United States Patent [19]

Dhein et al.

[11] Patent Number: 4,627,949

[45] Date of Patent: Dec. 9, 1986

[54] PROCESS FOR THE PREPARATION OF SHAPED ARTICLES OF STABILIZED POLYCARBONATE BY THE DEVOLATILIZING INJECTION-MOULDING OR DEVOLATILIZING EXTRUSION PROCESS

[75] Inventors: Rolf Dhein, Krefeld; Helmut M. Meier, Hattingen; Hans J. Meissner, Krefeld-Bockum; Klaus Kircher, Leverkusen, all of Fed. Rep. of Germany; Udo Oels, Baytown, Tex.

[73] Assignee: Bayer Aktiengesellschaft, Leverkusen, Fed. Rep. of Germany

[21] Appl. No.: 644,484

[22] Filed: Aug. 27, 1984

[30] Foreign Application Priority Data

Sep. 6, 1983 [DE] Fed. Rep. of Germany ....... 3332065

[51] Int. Cl.$^4$ ................................................. B28B 0/00
[52] U.S. Cl. ..................................... 264/101; 264/102; 264/211; 264/331.11; 524/154
[58] Field of Search ................. 524/154; 264/101, 102

[56] References Cited

U.S. PATENT DOCUMENTS

| | | | |
|---|---|---|---|
| 3,267,075 | 8/1966 | Schnell et al. | 264/102 |
| 3,335,111 | 8/1967 | Pray et al. | 264/102 |
| 3,437,638 | 4/1969 | Bottenbruch et al. | 264/102 |
| 3,488,317 | 1/1970 | Hechelhammer et al. | 264/102 |
| 3,567,813 | 3/1971 | Keane et al. | 264/102 |
| 3,597,390 | 8/1971 | Miller | 524/154 |
| 4,065,532 | 12/1977 | Wild et al. | 264/102 |
| 4,092,288 | 5/1978 | Calkins et al. | 524/154 |
| 4,367,303 | 1/1983 | Eimers et al. | 524/154 |
| 4,471,104 | 9/1984 | Krishnan et al. | 528/199 |

FOREIGN PATENT DOCUMENTS

| | | |
|---|---|---|
| 0953049 | 8/1974 | Canada ................. 524/154 |
| 2510463 | 9/1976 | Fed. Rep. of Germany . |
| 72022088 | 5/1968 | Japan . |
| 1350338 | 4/1974 | United Kingdom . |
| 1561890 | 3/1980 | United Kingdom . |

*Primary Examiner*—Joseph L. Schofer
*Assistant Examiner*—J. M. Reddick
*Attorney, Agent, or Firm*—Gene Harsh; Joseph C. Gil; Aron Preis

[57] ABSTRACT

The present invention relates to a process for the preparation of polycarbonate shaped articles from polycarbonates stabilized with phosphanes by the devolatilizing injection-moulding or devolatilizing extrusion process.

2 Claims, No Drawings

PROCESS FOR THE PREPARATION OF SHAPED ARTICLES OF STABILIZED POLYCARBONATE BY THE DEVOLATILIZING INJECTION-MOULDING OR DEVOLATILIZING EXTRUSION PROCESS

The stabilisation of polycarbonates with phosphines, or phosphanes, as they are termed according to more recent nomenclature is known from Japanese Offenlegungsschrift 7 222 088 in the name of Mitsubishi Gas Chemical Co. (filing date: May 28 1968, publication date 21.6.1972). According to this literature reference the polycarbonate phosphite stabilizers of that time were not fully satisfactory. Thorough drying of the plastics to be stabilised is however evidently recommendable when incorporating phosphine (phosphane) stabilisers according to this Japanese Offenlegungsschrift.

The stabilisation of polycarbonates with phosphines is also known from German Offenlegungsschrift No. 2206720, epoxy compounds also being additionally used, if appropriate.

It is known from column 6 of U.S. Pat. No. 4367303, and page 17 of German Offenlegungsschrif No. 3026503, that the stabilisation with triphenylphosphine (comparative test IB) is inferior to that with oxetane-group-containing phosphite (comparative test IA) with regard to heat ageing.

According to v. Hooren and Kaminski, Plastikverarbeiter No. 8/1980, pages 441 to 446 "Entgasungsspritzgießen, ein Laborkonzept wird in die Praxis umgesetzt" (Devolatilising injection-moulding, a laboratory concept is put into practice) polycarbonate stabilised with oxetane-group-containing phosphites can also, in addition to other plastics, be processed according to the devolatilising injection-moulding process (loc. cit. page 446, top of the left column). The dehumidification of the plastic material to be processed, in this case the polycarbonate to be processed, by means of the devolatilising unit, is important both for the devolatilising injection moulding process and for the devolatilising extrusion process.

The devolatilising unit differs from the normal injection-moulding unit by a so-called devolatilisation orifice and by the screw geometry. Whilst the normal injection-moulding screw has an intake zone with a subsequent compression zone and expulsion zone, a devolatilising unit consists of an intake zone, a compression zone, a decompression zone a 2nd compression zone and an expulsion zone. At the start of the decompression zone, in the screw barrel, is the devolatilisation orifice, through which the devolatilisation operation proceeds, as a result of the melt being let down. It is not necessary to apply a vacuum to the devolatilisation orifice, since the vapour pressure of the water in the undried polycarbonate reaches pressures from 16 to 130 bar in the decompression zone. In the first compression zone, the polycarbonate is exposed to severe heat, and in the second compression zone, renewed exposure to heat occurs. The material thus undergoes twice the exposure to heat, compared with the normal injection moulding technique. A detailed description of the devolatilisation method can be found in the above-mentioned reference.

Since, according to the above, on the one hand greater thermal stress is used and on the other hand moist material is used in the devolatilising injection-moulding and devolatilising extrusion process it is surprising that polycarbonates stabilised with phosphines (phosphanes) can be processed at least equally as well by this process, as polycarbonates stabilised with oxetane-group-containing phosphites. In view of the teaching of the Japanese Offenlegungsschrift and of the US Patent this was not to be expected.

The invention thus relates to a process for the production of polycarbonate shaped articles and of shaped articles of blends which contain polycarbonates by the devolatilising injection-moulding or devolatilising extrusion process, characterised in that thermoplastic polycarbonates containing phosphanes of the general formula $$(R)_2PR_1 \qquad (I)$$

wherein

R is an unsubstituted or substituted $C_6$–$C_{14}$-aryl radical and $R_1 = R$ or an unsubstituted or substituted $C_1$–$C_{18}$-alkyl radical, are used.

The radicals R in the compounds of the formula (I) can be either identical or different.

The phosphanes to be used according to the invention should have a boiling point of at least 200° C. According to the invention, the polycarbonate shaped articles are stabilised against the influence of heat and/or oxygen.

In the compounds of the formula (I), the aryl radicals R can also be substituted, for example, by alkyl substituents, halogens or OH. The alkyl radicals $R_1$ of the compounds of the formula (I) can be straight-chain or branched. They can be substituted for example, by OH, alkylcarboxyl, cyano or phenyl.

Examples of phosphanes of the formula (I) which are suitable according to the invention are: triphenylphosphane, diphenylbutylphosphane, diphenyloctadecylphosphane, tris-p-tolylphosane, tris-(p-nonylphenyl)-phosphane, tris-naphthylphosphane, diphenyl-(hydroxymethyl)-phosphane, diphenylacetoxymethylphosphane, diphenyl-(β-ethylcarboxyethyl)-phosphane, tris-(p-chlorophenyl)-phosphane, tris-(p-fluorophenyl)-phosphane, diphenylbenzylphosphane, diphenyl-β-cyanoethylphosphane, diphenyl-(p-hydroxyphenyl)-phosphane, diphenyl-1,4-dihydroxyphenyl-2-phosphane and phenylnaphthylbenzylphosphane.

Either individual compounds or mixtures of the phosphanes mentioned can be used.

The phosphanes of the formula (I) are known from the literature or they can be prepared by processes which are known from the literature.

The thermoplastic polycarbonates to be processed into shaped articles according to the invention are polycondensates which are obtainable by reacting diphenols with phosgene or diesters of carbonic acid, dihydroxydiarylalkanes, the aryl radicals of which carry methyl groups or halogen atoms in the o- and/or m-position relative to the hydroxyl group also being suitable, in addition to unsubstituted dihydroxydiarylalkanes. Branched polycarbonates are also suitable.

The polycarbonates to be processed into shaped articles have average molecular weights $\overline{M}w$ of between 10,000 and 100,000, preferably between 20,000 and 40,000, determined by measuring the relative viscosity in $CH_2Cl_2$ at 25° C. and at a concentration of 0.5% by weight. Examples of suitable diphenols are hydroquinone, resorcinol, 4,4'-dihydroxydiphenyl, bis-(hydroxyphenyl)-alkanes, such as for example $C_1$–$C_8$-alkylene- or $C_2$–$C_8$-alkylidene-bis phenols, bis-(hydroxyphenyl)-cycloalkanes, such as, for example, $C_5$–$C_{15}$-cycloalkylene- or $C_5$–$C_{15}$-cycloalkylidene-bisphenols, bis-(hydroxy-phenyl) sulphides, ethers, ketones, sulphoxides or sulphones, and furthermore $\alpha,\alpha'$-bis-(hydroxy-phenyl)-diisopropylbenzene and the corresponding nuclear-alkylated or nuclear-halogenated compounds. Polycarbonates based on 2,2-bis-(4-hydroxyphenyl)-propane (bisphenol A), 2,2-bis-(4-hydroxy-3,5-dichloro-phenyl)-propane (tetrachlorobisphenol A), 2,2-bis-(4-hydroxy-3,5-dibromophenyl)-propane (tetrabromobisphenol A), 2,2-bis-(4-hydroxy-3,5-dimethyl-phenyl)-propane (tetramethylbisphenol A) and 1,1-bis-(4-hydroxyphenyl)-cyclohexane (bisphenol Z), and those based on trinuclear bisphenols, such as $\alpha,\alpha'$-bis-(4-hydroxyphenyl)-p-diisopropylbenzene, are preferred.

Other bisphenols which are suitable for the preparation of polycarbonates are described in U.S. Pat. Nos. 3,028,365, 2,999,835, 3,148,172, 2,970,131, 2,991,273, 3,271,367 and 2,999,846.

The addition of the phosphanes can be carried out in any desired manner, advantageously, for example, in the course of the preparation of the polycarbonate, and, especially, since the stabilisers are liquid at a relatively low temperature, in a continuous manner. In this case, the phosphane can be introduced continuously, via a suitable conveying pump, during the end phase of the preparation, in which the molten polycarbonate is continuously freed from the solvent in a conveying screw in vacuo. It is of course furthermore possible for the polycarbonate also to be stabilised with the phosphane after its preparation, for example by so-called tumbling; this method is described in the examples of this Application and is known from the literature.

The amounts of phosphane to be employed are between 0.01 and 1% by weight, preferably between 0.02 and 0.5% by weight and in particular between 0.05 and 0.2% by weight, in each case based on the total weight of thermoplastic polycarbonate and phosphane.

The polycarbonates to be processed according to the invention can also contain the known additives, such as, for example, fillers, dyestuffs, pigments and/or other stabilisers.

The thermoplastic polycarbonates to be processed according to the invention can also be mixed with other thermoplastics in a known manner, for example with ABS polymers, polystyrenes, polyarylene-sulphones or polyalkylene terephthalates.

The polycarbonates processed according to the invention are used in all cases where the shaped articles produced are exposed to high temperatures for a relatively long time, and in addition for all articles for which a high transparency is required. This applies preferably to use in the light field, for example for lamp covers or glazing with polycarbonate sheets.

The part mentioned in the examples are parts by weight.

Preparation of a polycarbonate 454 parts of 2,2-bis-(p-hydroxyphenyl)-propane and 2.5 parts of p-tert.-butylphenol are suspended in 1.5 liters of water in a 3-necked flask equipped with a stirrer and gas inlet tube, and the oxygen is then removed from the reaction mixture by passing nitrogen through the reaction mixture for 15 minutes, with stirring. 355 parts of 45% strength sodium hydroxide solution and 1,000 parts of methylene chloride are then added. The mixture is cooled to 25° C. 237 parts of phosgene are introduced over a period of 120 minutes, whilst maintaining this temperature by cooling. An additional amount of 75 parts of 45% strength sodium hydroxide solution is added after 15 to 30 minutes, or after the uptake of phosgene has started. 1.6 parts of triethylamine are added to the resulting solution and the mixture is stirred for a further 15 minutes. A highly viscous solution is obtained, its viscosity being regulated by addition of methylene chloride. The aqueous phase is removed. The organic phase is washed with water until free from salts and alkali. The polycarbonate is isolated from the washed solution and dried. The polycarbonate has a relativi viscosity of 1.29 to 1.30, measured in a 0.5% strength solution of methylene chloride at 20° C. This approximately corresponds to a molecular weight of 32,000. The polycarbonate thus obtained is extruded and granulated.

Preparation of stabilised polycarbonates and processing conditions

The granular polycarbonate prepared according to the above description is, if appropriate, compounded with the stabilisers listed in the examples on a ZSK 32 extruder at 270° C. The products are injection-moulded to broad bars, and in particular a) on a normal injection-moulding unit at a temperature setting of 300° C. and b) on a devolatiising unit at temperature settings of 295° C. (nozzle), 290° C., 275° C. and 295° C., Which corresponds to a material temperature of about 305° C.

| Type of processing | $\Delta C$ YB | Y(h) | $\Delta\Delta C$ YB |
|---|---|---|---|
| Comparison 1 | | | |
| Composition: non-stabilised polycarbonate | | | |
| N | 1.8 | 89.3% | 1.4 |
| DV | 3.2 | 88.8% | |
| Comparison 2 | | | |
| Composition: polycarbonate + 0.1% of | | | |
| $P(O-CH_2-\underset{\underset{O}{\mid}}{\overset{\overset{C_2H_5}{\mid}}{C}})_3$ | | | |
| N | 1.9 | 89.4% | 0.8 |
| DV | 2.7 | 86% | |
| Comparison 2a | | | |
| (the same as comparison 2, but with different starting products) | | | |
| N | 1.0 | — | 0.4 |
| DV | 1.4 | — | |
| Example 1 | | | |
| Composition: polycarbonate + 0.2% of $P(C_6H_5)_3$ | | | |
| N | 2.0 | — | 0.6 |
| DV | 2.6 | — | |
| Example 1a | | | |
| Composition: polycarbonate + 0.1% $P(C_6H_5)_3$ | | | |
| N | 1.2 | — | 0.1 |
| DV | 1.3 | — | |

Explanation of symbols:
$\Delta C$: + yellow deviation, − blue deviation according to FMC-II, measured against neutral
$\Delta\Delta C$: $\Delta C_{YB}$ (devolatilising injection-moulding)
YB: $\Delta C_{YB}$ (normal injection-moulding)
Y(h): corrected transparency
N: normal injection-moulding
DV: devolatilising injection-moulding
FMC-II: colour separation formula according to Friele, MacAdams and Chickering.

We claim:

1. Process for the production of polycarbonate shaped articles by the devolatilizing injection-moulding or devolatilizing extrusion process, wherein the thermoplastic polycarbonate composition contains 0.1 to 0.1% of a phosphane of the general formula (I)

$$(R)_2PR^1 \qquad (I)$$

wherein
R is selected from the group consisting of unsubstituted $C_6$–$C_{14}$-aryl radicals, alkyl substituted $C_6$–$C_{14}$-aryl radicals and hydroxy substituted $C_6$–$C_{14}$-aryl radicals, and $R^1$ is selected from the group consisting of unsubstituted $C_6$–$C_{14}$-aryl radicals, unsubstituted $C_1$–$C_{18}$-alkyl radicals and substituted $C_6$–$C_{14}$-aryl and $C_1$–$C_{18}$-alkyl radicals wherein substitutes are any of hydroxy, alkyl-carboxyl, cyano or phenyl radicals.

2. Process according to claim 1 wherein the polycarbonate has an average molecular weight of between 10,000 and 100,000.

* * * * *

UNITED STATES PATENT AND TRADEMARK OFFICE
CERTIFICATE OF CORRECTION

PATENT NO. : 4,627,949

DATED : December 9, 1986

INVENTOR(S) : Rolf Dhein et al

It is certified that error appears in the above-identified patent and that said Letters Patent is hereby corrected as shown below:

At column 2, line 40, correct "tris-p-tolylphosane" to "tris-p-tolylphosphane".

At column 4, line 15, correct "relativi" to "relative".

At column 4, line 29, correct "devolatiising" to "devolatilising".

<u>IN THE CLAIMS</u>:

In Claim 1, at column 5, line 4, correct "0.1 to 0.1%" to ".01 to 0.1%".

Signed and Sealed this

Eighth Day of October, 1996

Attest:

BRUCE LEHMAN

Attesting Officer     Commissioner of Patents and Trademarks